May 29, 1945. S. H. PERSSON 2,376,935
CHLORINE DIOXIDE MANUFACTURE
Filed Jan. 10, 1944
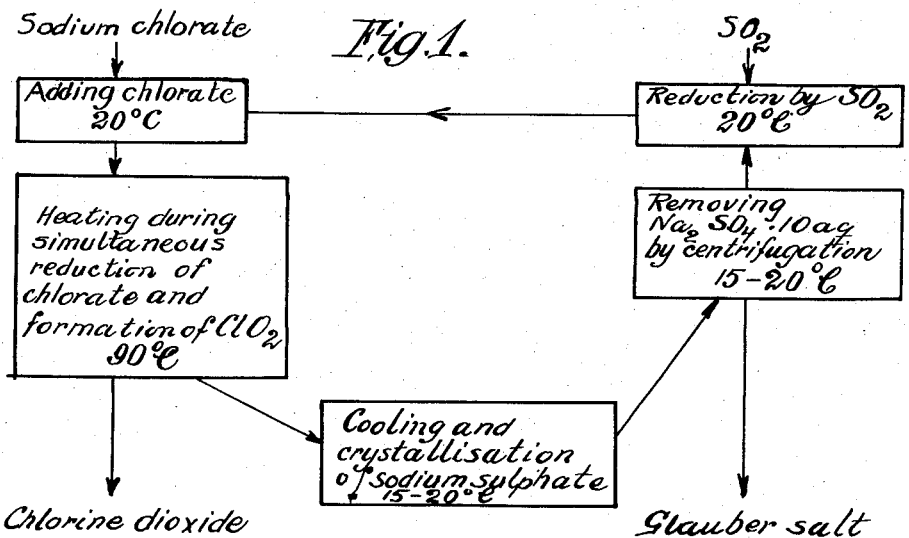
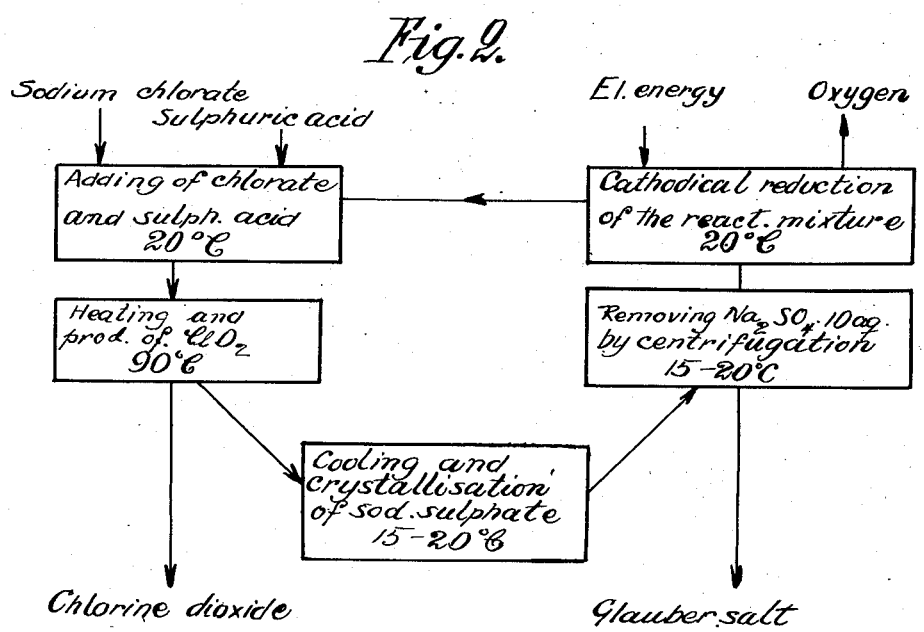
Inventor
Sven H. Persson
by Sommers+Young
Attorneys Patented May 29, 1945

2,376,935

UNITED STATES PATENT OFFICE 2,376,935

CHLORINE DIOXIDE MANUFACTURE

Sven Helmer Persson, Stockholm, Sweden, assignor to Aktiebolaget Duba, Stockholm, Sweden Application January 10, 1944, Serial No. 517,713
In Sweden December 22, 1942

12 Claims. (Cl. 23—152)

This invention relates to the production of chlorine dioxide by a reduction of metal chlorates, particularly alkali metal chlorates or alkaline earth metal chlorates. The object of the invention is to improve said process with a view to allowing the manufacture on a commercial scale and in a preferably cyclic manner of a chlorine dioxide practically free from chlorine with the use of inexpensive, easily obtainable and easily workable reducing agents.

It is well-known to produce chlorine dioxide ($ClO_2$) by reducing chloric acid or chlorates in acid solution. As reducing agents a lot of substances have been proposed and tested. Amongst others attempts have been made to directly reduce chlorates by means of such inexpensive reducing agents as carbon, sulphur, sulphur dioxide and so on, but such attempts have not given the result desired owing to the bad yield and the contamination of the chlorine dioxide obtained by chlorine or by gaseous reaction products, such as carbonic oxide and sulphur dioxide. Attempts have also been made to produce chlorine dioxide by a direct cathodic reduction of chloric acid or salts of chloric acid but even these attempts have not given any satisfactory results. In order to obtain a higher yield and a more pure chlorine dioxide it has been proposed to use as reducing agents salts of certain metals which may appear in different valence states and which may be oxidized from a lower to a higher valence level during the reduction of the chlorate. With a view to rendering this process economical it has further been proposed to remove the oxidized form of the generally expensive reducing agent from the reaction mixture and regenerate it. This process, however, requires a comparatively great number of operations, rendering the process expensive and the continuous carrying out thereof difficult.

The present invention is based upon experiments I have made in order to observe the kinetics of the reaction in the reduction of chlorates. By these experiments I have found that the production of chlorine dioxide from metal chlorates or from chloric acid is a mere electrochemical process, for instance, according to the equation:

$$ClO_3^- + 2H^+ + e^- = ClO_2 + H_2O \qquad (1)$$

The normal potential of this reaction amounts to between +1.5 and +1.6 volt. Thus, the reduction of chlorate ions requires a reducing agent the normal reduction-oxidation-potential (red.-ox.-potential) of which is below said value. The reaction is reversible but subject to severe obstructions (a restrictive reversible reaction). Thus, the reaction rate as obtained with the use of a reducing agent having a red.-ox.-potential higher than +1.0 volt at 25° C. will be practically nil and even at 50° C. very low. Only at a temperature of 70-90° C. will the reaction rate be sufficiently high to permit a practical use of the reaction. The reaction rate depends not only on the temperature but also on the concentration of the chlorate and hydrogen ions in the solution as well as on the difference between the red.-ox.-potentials of the chlorate and the reducing agent.

In addition to the reaction above stated the following undesirable by-reactions may occur:

$$ClO_2 + 4H^+ + 5e^- = Cl^- + 2H_2O \qquad (2)$$

$$Cl^- = \tfrac{1}{2}Cl_2 + e^- \qquad (3)$$

As is readily seen, the Reaction 2 involves reducing chlorine dioxide to chloride and the Reaction 3 involves oxidation of chloride to free chlorine. Reaction 2 requires a reducing agent the red.-ox.-potential of which is lower than +1.0 volt and Reaction 3 requires an oxidation agent the potential of which is higher than +1.3 or +1.4 volts. Reaction 2 is irreversible and, therefore, proceeds at a rate rapidly increasing with increased temperature, whereas Reaction 3 is reversible.

It is now easy to explain why the methods hitherto proposed for the production of chlorine dioxide by a direct reduction of metal chlorates by means of inexpensive reducing agents, such as sulphur, sulphur dioxide, carbon, carbon oxide, cathodically evolved hydrogen and so on, have given bad yields of chlorine dioxide and caused a considerable formation of chloride and chlorine. This is due to the fact that all of said reducing agents have red.-ox.-potentials substantially below +1.0 volt. In such case it is impossible to prevent the formation of chloride to a great extent. The chloride in its turn is oxidized to free chlorine under the influence of chlorate present. Thus, a bad yield and a chlorine dioxide highly contaminated by chlorine will be obtained by this process.

The drawbacks inherent to the above outlined hitherto used methods of producing chlorine dioxide may be overcome according to my present invention by carrying out the reduction of the chlorate in presence of a primary reducing agent of such a character as not to reduce the chlorine dioxide in any essential degree and the oxidation stage of which under appropriate working conditions may be reduced by another, or secondary, reducing agent more quickly than any metal chlorate present or any chlorine dioxide that might, by chance, be present.

The metal chlorates under consideration are, especially, chlorates of alkali metals, alkaline earth metals or magnesium. The reducing agent as used in performing the reduction of the chlorate and other working conditions, such as concentration of the chlorate, acidity, percentage of chloride, temperature and so on, should be so chosen that a chlorine dioxide possibly free from chlorine and a high efficiency may be obtained. The concentration of the chlorate should be high during the whole reduction process so that chlorate will still remain as the reaction is ended. The percentage of chloride, on the contrary, should be held low as, otherwise, the chlorine dioxide would be contaminated by chlorine. The reduction potential of the reducing agent should not have too low a value as, otherwise, the reduction of the chlorate may be extended too far and give rise to the formation of chloride ions and chlorine with a resulting bad yield and an impure chlorine dioxide. As the second reduction process—that is, the reduction of the reaction mixture—is carried out under such conditions as to cause no or only a slight reduction of any chlorate that might be present, the secondary reducing agent need not satisfy equally high requirements as the primary reducing agent, thereby allowing a great freedom as to the choice of the secondary reducing agent. In order that the process according to the invention may be carried out continuously in a simple way, provisions should be made to permit an easy removal of the oxidized form of the said last mentioned reducing agent from the reaction mixture.

The invention may be applied with good result both to certain reducing agents previously proposed for the reduction of chlorate, such as, for instance, $Cr^{III}$-salts, and to other reducing agents which I have found well fit for this purpose, namely oxides or salts of the elements arsenic, antimony and bismuth in their lower valence levels. As reducing agent to be employed in the second reduction process especially sulphur dioxide ($SO_2$) has proved applicable due, in part, to the ease with which it reacts and, in part, to its low price. Moreover, $SO_2$ has the advantage that the required acidity of the reaction mixture may be maintained without any extra addition of acids. The fact that $SO_2$ is cheaper than a corresponding quantity of any other acid that can be used for this purpose is of great importance for the economy of the process.

Instead of $SO_2$ I may use many other reducing agents, such as sulphides and other sulphurous substances, for instance, CO and so on, though with many of such substances acid should be added continuously in order to maintain the acidity.

The invention also involves a technical and economical method of regenerating the reducing agent as used for the decomposition of the chlorate by carrying out a cathodical reduction directly in the reaction mixture.

For carrying out the reduction of the chlorate I employ in a preferred embodiment of my invention a primary reducing agent the red.-ox.-potential of which lies in the range from +1.0 to +1.6 volt, and preferably from +1.0 to +1.3 volt. According to the invention said reaction mixture is first cooled to a temperature below 40° C. and subjected, while maintained at this temperature, to the influence of a secondary reducing agent the red.-ox.-potential of which is less than +1.0 volt. Owing to the low temperature practically no formation of chlorine dioxide according to Reaction 1 takes place, but substantially only a transfer of the reversible red.-ox.-system from its oxidized to its reduced form. This reduction process, however, should only be continued up to a point where, at most, 95% of the primary reducing agent is present in its reduced form, as otherwise its controlling influence on the red.-ox.-potential of the solution would be diminished so that a reduction of chlorate to chlorine dioxide and chloride may take place. After the admission of the secondary reducing agent from outside has been completed, the temperature of the reaction mixture is raised to above 60° C. and preferably to 80–90° C. under simultaneous introduction of a stream of an inert gas. This expedient causes the reduced form of the primary reducing agent present to reduce the metal chlorate to chlorine dioxide according to Reaction 1 which reaction, in spite of its irreversible character, takes place at a comparatively high rate owing to the raised temperature. On the contrary, there will be practically no formation of chloride and free chlorine according to the Reactions 2 and 3, as the red.-ox.-potential required will not be obtained because of the presence of the primary reducing agent. To this end the reduction of the chlorate, however, must only be continued until at most 95% of the primary reducing agent is present in its oxidized form. Then the metal salt resulting from the reduction of the metal chlorate is separated from the solution, while a corresponding quantity of metal chlorate is dissolved in the reaction mixture. Said mixture can then be again used in carrying out the processes above described. Thus, the method may be operated in a cyclic manner.

As primary reducing agent I prefer according to my present invention to use a mixture of water soluble $Cr^{III}$-$Cr^{VI}$ compounds or a mixture of water soluble $Tl^{I}$- and $Tl^{III}$-salts having a red.-ox.-potential of about 1.2 volts and a high reversibility. In the accompanying drawing, Figs. 1 and 2 illustrate two preferred embodiments of the invention.

In the example shown in Fig. 1 I use as primary reducing agent chromic sulphate $Cr_2(SO_4)_3$ and as secondary reducing agent sulphur dioxide $SO_2$. A solution of sodium chlorate in diluted sulphuric acid containing a suitable quanity of $Cr_2(SO_4)_3$ is caused to pass through a reaction vessel 1 while simultaneously heated to a temperature exceeding 40–50° C. By this expedient a certain amount of the chlorate will be reduced to chlorine dioxide, a corresponding amount of $Cr_2(SO_4)_3$ being oxidized to the form of combination corresponding to $H_2Cr_2O_7$ and a certain amount of sodium sulphate being formed as a by-product. The solution is then introduced into a cooler 2 together with a stream of air, resulting into a crystallization of Glauber-salt ($Na_2SO_4$, 10 aq.) which is continuously separated from the solution, for instance, by centrifugation, at 3. After the removal of the salt the solution is subjected to a countercurrent flow of roasting gases containing $SO_2$, at 4, causing the oxidized chromium compound to be again reduced to its 3-valence form. During this second reduction process the temperature is maintained, by means of cooling, below 40° C., as for instance, at 20° C. At 5 in the drawing another quantity of sodium chlorate is added, either in solid state or as a concentrated solution to the reduction mixture obtained and the mixture thus obtained is reintroduced in the process at its starting point 1. Thus, the process will become practically continuous.

Instead of $Cr_2(SO_4)_3$ I may use as primary reducing agent, for instance, $As_2O_3$ or $FeSO_4$, though not with equally good result.

In Fig. 2 is shown an embodiment of the invention according to which the rereduction of the primary reducing agent is effected in electrochemical way. For the rest, the process is substantially similar to that above described with reference to Fig. 1. In this embodiment I add, at 5, except the metal chlorate also a certain quantity of sulphuric acid for maintaining the acidity.

While in the embodiments of the invention above described the two reduction processes are separated from each other as to time and, by chance, also as regards space, it is to be noted that the invention may also be carried out in such a way that both of the reduction processes take place at the same time. This is due to those differences in respect of the coefficiences of temperature and the conditions of reversibility of the various reaction processes which are referred to in the preamble of this specification. Above all, care should be taken to remove the chlorine dioxide continuously and most rapidly from the reaction space, as for instance, by means of a stream of an inert gas. This expedient serves, on the one hand, to accelerate the Reaction 1 when going on in the direction from the left to the right and, on the other hand, to keep the concentration of the chlorine dioxide according to the Reactions 2 and 3 as low as possible. Another condition involves adding the secondary reducing agent in a quantity corresponding to the rate of formation of the chlorine dioxide and thus also to the oxidation stage of the primary reducing agent, so that the relation of quantity between the reduced and the oxidizing forms of this reducing agent may remain approximately constant. The relation of quantity as such may be between 0.05 and 20 and, preferably, in the neighbourhood of 1.

Thus, in this case the primary reducing agent acts as a buffer or false catalyst. The quantity of the secondary reducing agent to be added per unit of time, is determined by the rate of formation of the chlorine dioxide. Said rate may be varied within wide limits by variation of the acidity, the percentage of chlorate and the temperature of the reaction mixture. According to circumstances I may remove the metal salt as produced by the reduction of the metal chlorate either continuously or at certain intervals and add a corresponding quantity of chlorate to the reaction mixture.

As primary reducing agent it is preferred according to this embodiment of the invention to use a mixture of water soluble $Cr^{III}$- and $Cr^{VI}$- compounds or a mixture of water soluble $Tl^{I}$- and $Tl^{III}$-shalts having a red.-ox.-potential of about +1.2 volts and a high degree of reversibility.

As secondary reducing agent I prefer to use sulphur dioxide which besides its low price has the added advantage that it yields a sufficient amount of acid during its oxidation. With the use of sodium chlorate as a starting material the reduction by sulphur dioxide yields in addition to chlorine dioxide also sodium sulphate which, by cooling, may be easily removed as crystals.

It will be understood that the producing of chlorine dioxide by the one-stage method means a considerable simplification as compared with the two-stage method. On the other hand, however, the yield will be somewhat lower and the percentage of chlorine in the chlorine dioxide somewhat higher in the one-stage method than in the two-stage method.

What I claim is:

1. A process for preparing chlorine dioxide which comprises reducing a chlorate in aqueous solution with a primary reducing agent having a normal oxidation-reduction potential in the range from —1.0 to —1.6 volts, at a temperature above 70° C. to convert at least a part of the chlorate to chlorine dioxide without substantial concurrent formation of chlorine, then adding to the reaction mass a secondary reducing agent having a normal oxidation-reduction potential of less than —1.0 volt, at a temperature below 40° C., to regenerate a major part of reducing agent to its reducing form without substantial reduction of chlorate, and recycling the regenerated mass to the primary reducing step with added chlorate.

2. A process for preparing chlorine dioxide according to claim 1, and in which the metal chlorate is a chlorate of a metal consisting of alkali metals.

3. A process for preparing chlorine dioxide according to claim 1, and in which the primary reducing agent is a compound of arsenic.

4. A process for preparing chlorine dioxide according to claim 1, and in which the primary reducing agent is a mixture of water soluble $Cr^{III}$- and $Cr^{VI}$-compounds.

5. A process for preparing chlorine dioxide according to claim 1, and in which the primary reducing agent is a mixture of water soluble $Tl^{I}$- and $Tl^{III}$-salts.

6. A process for preparing chlorine dioxide according to claim 1, and in which the secondary reducing agent is sulphur dioxide.

7. A process for preparing chlorine dioxide according to claim 1, and in which the secondary reducing agent is carbon dioxide.

8. A process for preparing chlorine dioxide according to claim 1, and in which the secondary reducing agent is hydrogen sulphide.

9. A process for preparing chlorine dioxide which comprises reducing a chlorate in aqueous solution with a primary reducing agent having a normal oxidation-reduction potential in the range from —1.0 to —1.6 volts, at a temperature above 70° C. to convert at least a part of the chlorate to chlorine dioxide without substantial concurrent formation of chlorine, adding to the reaction mass a secondary reducing agent having a normal oxidation-reduction potential of less than —1.0 volt, at a temperature below 40° C., to regenerate a major part of reducing agent to its reducing form without substantial reduction of chlorate, and recycling the regenerated mass to the primary reducing step with added chlorate, the primary and secondary reductions being carried out simultaneously.

10. A process for preparing chlorine dioxide which comprises reducing a chlorate in aqueous solution with a primary reducing agent having a normal oxidation-reduction potential in the range from —1.0 to —1.6 volts, at a temperature above 70° C. to convert at least a part of the chlorate to chlorine dioxide without substantial concurrent formation of chlorine, adding to the reaction mass a secondary reducing agent having a normal oxidation-reduction potential of less than —1.0 volt, at a temperature below 40° C., to regenerate a major part of reducing agent to its reducing form without substantial reduction of chlorate, recycling the regenerated mass to the primary reducing step with added chlorate, and continuously removing the chlorine dioxide from the reaction space by passing therethrough a stream of inert gas.

11. A process for preparing chlorine dioxide which comprises reducing a chlorate in aqueous solution with a primary reducing agent having a normal oxidation-reduction potential in the range from −1.0 to −1.6 volts, at a temperature above 70° C. to convert at least a part of the chlorate to chlorine dioxide without substantial concurrent forrmation of chlorine, adding to the reaction mass a secondary reducing agent having a normal oxidation-reduction potential of less than −1.0 volt, at a tempertaure below 40° C., to regenerate a major part of reducing agent to its reducing form without substantial reduction of chlorate, recycling the regenerated mass to the primary reducing step with added chlorate, and continuing the primary reduction process until at most 95 per cent of the primary reducing agent is transformed into its higher oxidized form.

12. A process for preparing chlorine dioxide which comprises reducing a chlorate in aqueous solution with a primary reducing agent having a normal oxidation-reduction potential in the range from −1.0 to −1.6 volts, at a temperature above 70° C. to convert at least a part of the chlorate to chlorine dioxide without substantial concurrent formation of chlorine, adding to the reaction mass a secondary reducing agent having a normal oxidation-reduction potential of less than −1.0 volt, at a temperature below 40° C., to regenerate a major part of reducing agent to its reducing form without substantial reduction of chlorate, and recycling the regenerated mass to the primary reducing step with added chlorate, the amount of secondary reducing agent added being limited to an amount which will effect transformation of at most 95 per cent of the primary reducing agent to its lower reduced form.

SVEN HELMER PERSSON.